(12) United States Patent
Price et al.

(10) Patent No.: US 7,396,492 B2
(45) Date of Patent: Jul. 8, 2008

(54) ELECTRICALLY CONDUCTIVE RESIN COMPOUNDS BASED ON POLYOXYMETHYLENE AND HIGHLY STRUCTURED CARBON BLACK

(76) Inventors: Kenneth Leon Price, 2110 Blankenbecker Dr., Florence, KY (US) 41042; Jeroen Franklin Visjager, 3819 Bremen Pass, Cleves, OH (US) 45002; Stefan Kutta, 8491 Woodcreek Dr., Florence, KY (US) 41041

( * ) Notice: Subject to any disclaimer, the term of this patent is extended or adjusted under 35 U.S.C. 154(b) by 0 days.

(21) Appl. No.: 11/393,322

(22) Filed: Mar. 30, 2006

(65) Prior Publication Data

US 2007/0235693 A1 Oct. 11, 2007

(51) Int. Cl.
*H01B 1/06* (2006.01)
*H01B 1/02* (2006.01)
*B60C 1/00* (2006.01)

(52) U.S. Cl. .................. 252/511; 252/519.5; 524/496

(58) Field of Classification Search ............... 252/500, 252/519.3, 519.33, 511, 519.5; 524/496
See application file for complete search history.

(56) References Cited

U.S. PATENT DOCUMENTS

| 4,391,741 | A | 7/1983 | Masamoto et al. | |
|---|---|---|---|---|
| 6,262,165 | B1 | 7/2001 | Ariyasu et al. | |
| 6,610,765 | B1 * | 8/2003 | Pfaendner et al. | 524/108 |
| 6,790,385 | B2 * | 9/2004 | Schleith et al. | 252/511 |
| 2003/0102464 | A1 | 6/2003 | Schleith et al. | |

OTHER PUBLICATIONS

"Practical Applications of Macromonomer Techniques for the Synthesis of Comb-Shaped Copolymers", Applications of Anionic Polymerization Research, R.P. Quirk, Ed., *ACS Symp. Ser.* 696, 208 (1998), Roos, et al., Chapter 16, pp. 208-217.

"Controlled/"Living" Radical Polymerization. Atom Transfer Radical Polymerization in the Presence of Transition-Metal Complexes", Jin-Shan Wang, et al., *Journal of American Chemical Society* 1995, 117, pp. 5614-5615.

"Controlled/"Living" Radical Polymerization. Halogen Atom Transfer Radical Polymerization Promoted by a Cu(I)/Cu(II) Redox Process", Jin-Shan Wang, et al., *Macromolecules* 1995, 28, American Chemical Society 1995, pp. 7901-7910.

"Polymerization of Methyl Methacrylate with the Carbon Tetrachloride/Dichlorotris-(triphenylphosphine)ruthenium(II)/ Methylaluminum Bis(2,6-di-*tert*-butylphenoxide) Initiating System: Possibility of Living Radical Polymerization", Kato, et al., *Macromolecules* 1995, 28, pp. 1721-1723.

"Polymers with Very Low Polydispersities from Atom Transfer Radical Polymerization", Patten, et al., *Science*, vol. 272, May 10, 1996, pp. 866-868.

Mitsuo, et al., Abstract of Publication No. 09-208616, Aug. 1997, Japanese Patent Office.

Toshinobu, et al., Abstract of Patent No. 3614468, Nov. 12, 2004, Japanese Patent Office.

International Search Report for PCT/US2007/006179, mailed Aug. 17, 2007.

* cited by examiner

*Primary Examiner*—Mark Kopec
*Assistant Examiner*—Jaison P Thomas
(74) *Attorney, Agent, or Firm*—Miles B. Dearth

(57) ABSTRACT

This invention in one aspect is a polyoxymethylene compound exhibiting an improved balance of properties and volume resistivity of $10^0$-$10^6$ ohm-cm, which comprises polyoxymethylene, polyethylene glycol, metal oxide, high-structure carbon black and a comb polymer. The invention is more particularly directed to a polyoxymethylene compounds and molded articles therefrom in which the compound comprises 30 to 98.7% by weight of a polyoxymethylene homopolymer or copolymer, from 0.1 to 10% by weight of a polyalkylene glycol, from 0.1 to 10% by weight of metal oxide, from 1% to 15% of a high structured particulate carbon black, and from 0.1 to 15% by weight of a comb polymer containing a relatively less polar backbone with relatively more polar side chains.

22 Claims, No Drawings

ELECTRICALLY CONDUCTIVE RESIN COMPOUNDS BASED ON POLYOXYMETHYLENE AND HIGHLY STRUCTURED CARBON BLACK

FIELD OF INVENTION

The field of the invention pertains to electrically conductive thermoplastics, in particular polyoxymethylene compounds containing an effective amount of highly structured carbon black in an improved formulation with other essential components.

BACKGROUND

Because the electrical resistances within plastics are usually very high, there is a risk of electrostatic charging, and this can be disruptive in certain application sectors, or can even be dangerous. Prior approaches for reducing internal electrical resistance of polymer resins include the addition of metal powders and metal fibers, carbon fibers, graphite, or carbon black. Electrically conductive carbon black has been practiced as a method for imparting electrical conductivity to many thermoplastic resins, including polyoxymethylene (polyoxymethylene). Examples of electrically conductive polyoxymethylene resin compositions are disclosed in U.S. Pat. Nos. 4,391,741 and 4,555,357.

As is well-known, loading of fine powders of carbon black into thermoplastic resins significantly reduces the toughness and flexibility of the final molded product. Deficiencies in part performance usually are a result of poor elongation and low impact strength. Disadvantages in the use of highly structured carbon blacks with polyoxymethylene is their sensitivity toward processing conditions, in particular inconsistent volume Resistivity due to lot-to-lot differences in work history imparted to the compound. Melt processing of polyoxymethylene and conductive carbon black leads to severe increase in melt viscosity, leading to degraded melt flow, and making it more difficult to form molded articles, especially injection molded articles where close tolerance limits with respect to electrical conductivity are required. On the one hand, the dispersion of the carbon black has to be sufficiently good, and on the other hand excessive shear must not be allowed to break down the agglomerates. For this reason, the challenge in use of lubricant additives is for controlling the degree of shear within the melt while at the same time avoiding loss of physical properties.

U.S. Pat. No. 6,262,165 discloses conductive polyoxymethylene, including 1.0-30 parts by weight of conductive carbon powder having a DBP absorption of at least 200 ml/100 g., 1.0-30 parts by weight of a carbon fiber of a specified average fiber length and 0.001-5 parts by weight of a lubricant. The lubricants are not limited. Specific mention is made of akali metal salts or alkaline earth metal salts of aliphatic carboxylic acids, amide compounds such as ethylenebisstearylamide, and aliphatic alcohols such as stearyl alcohol and behenyl alcohol.

U.S. Pat. No. 4,831,073 issued to Polyplastics Co. Ltd. teaches conductive polyoxymethylene made by forming a pre-blend of polyoxymethylene and thermal stabilizer, e.g., alkali metal carbonate, or and alkaline earth metal carbonates, prior to incorporating loadings of conductive carbon, e.g., carbon black, carbon fibers and/or graphite.

U.S. Pat. No. 4,828,755 describes a mixture where use of polyethylene glycol and non-polar polyethylene wax achieve incorporation of carbon black into the resin matrix. However it is noted that abrasion resistance, mechanical properties, and heat resistance, were compromised.

U.S. Pat. No. 6,790,385 teaches a conductive polyoxymethylene mixture including one lubricant having predominantly external, i.e., surface-active effect, and a lubricant with predominantly internal lubricant action, i.e. viscosity-reducing effects predominantly within the melt.

Owing to the problems attendant with polyoxymethylene in the use of conductive carbon black, including loss of physical properties, especially elongation at break, it would be desirable to reduce the effective amount of carbon black yet retain electrical Resistivity of $10^6$ ohm-cm or less, and reduce variability of resulting properties obtained after injection molding.

SUMMARY OF THE INVENTION

This invention in one aspect is a polyoxymethylene compound comprising polyoxymethylene, polyethylene glycol, metal oxide, high-structure carbon black and a comb polymer.

In a specific aspect, the invention is directed to a polyoxymethylene compound comprising 30 to 98.7% by weight of a polyoxymethylene homopolymer or copolymer, from 0.1 to 10% by weight of a polyalkylene glycol, from 0.1 to 10% by weight of metal oxide, from 1% to 15% of a highly structured particulate carbon black, and from 0.1 to 5% by weight of a comb containing separate and discrete moieties one moiety being relatively higher in polarity than the other moiety.

In another aspect, the intention is directed to molded articles from the aforementioned polyoxymethylene compounds exhibiting a volume resistivity of from $10^0$ to $10^6$ ohm-cm, and especially from 10 to $10^3$ ohm-cm. The articles provide consistent electrical resistivity properties after injection molding the aforesaid compounds into a mold cavity to form a shaped article.

In a preferred aspect the invention is directed to a polyoxymethylene compound comprising 30 to 95.5% by weight of a polyoxymethylene homopolymer or copolymer; from 0.5 to 5% by weight, more preferably 1%-3% of a polyalkylene glycol; from 0.5 to 5% by weight, more preferably 0.5%-3% of metal oxide; from 2%-10% of a highly structured particulate carbon black, and from 1% to 3% by weight of a comb polymer containing a relatively less polar backbone with relatively more polar side chains. The invention is especially adapted for forming fuel system components including Fuel Pump housings, ICV Valves, fuel delivery modules, fuel sending modules and fuel tank mounted valves.

DETAILED DESCRIPTION

Reference to % below refers to % on a weight basis. Highly structured carbon blacks used herein are characterized by minimum dibutyl phthalate absorption of 275 ml /100 g and above. Suitable highly structured carbon black includes, for example, extra conductive furnace blacks like Ketjenblack Black® EC300J with DBP absorption of 330 ml/100 g, Ketjenblack Black EC-600JD with DBP absorption of 480 ml/100 g (Akzo Nobel), Brintex® XE2 (Degussa, Inc) with a DBP absorption of 370 ml/100 g, and the like. A useful and commercially available highly structure carbon black used to form electrically conductive polyoxymethylene resin is KETJENBLACK® EC (a product of Akzo Chemie). A detailed discussion of the various known carbon black grades and their manufacturing sources is provided in U.S. Pat. No. 5,373,046, and need not be detailed herein.

Polyacetal resins (polyoxymethylene) are widely known. See U.S. Pat. No. 3,027,352; and *Acetal Resins*, by T. J. Dolce and J. A. Grates, Encyclopedia of Polymer Science and Engineering, 2$^{nd}$ Ed., John Wiley and Sons, New York, 1985, Vol. 1 pp. 42-61. (Ref: U.S. Pat. No. 6,790,385). The polyoxymethylenes, for example as described in DE-A 29 47 490, are generally unbranched linear polymers, generally containing at least 80%, preferably at least 90%, of oxymethylene units (—CH$_2$O—). The term polyoxymethylenes here encompasses homopolymers of formaldehyde or of its cyclic oligomers, such as trioxane or tetroxane, and also corresponding copolymers, terpolymers and the like.

Polyoxymethylene homopolymers are prepared conventionally by polymerizing anhydrous formaldehyde or the trimer, trioxane. Polyoxymethylenes of suitable MW for use herein may be prepared by polymerizing trioxane in the presence of Lewis acid catalysts, e.g., antimony fluoride, or boron trifluoride (See, U.S. Pat. No. 2,989,506).

As is well known, ex reactor polyoxymethylene is stabilized predominantly by either end capping, e.g., acetylation of terminal hemiacetal (U.S. Pat. No. 2,998,409) via ester or ether groups or by hydrolysis (See U.S. Pat. No. 3,219,623).

Preferred for use herein are polyxymethylene copolymers with a proportion of 60-99.9% of recurring units being oxymethylene interspersed with the balance of oxy(higher alkylene)groups. Oxy(higher alkylene) groups are introduced via cyclic ether or cyclic formal having at least two adjacent carbon atoms in the ring in addition to trioxane, e.g., via ethylene oxide 1,3-dioxolane with trioxane. Mention may be made of cyclic ethers ethylene oxide, propylene 1,2-oxide, butylene 1,2-oxide, butylene 1,3-oxide, 1,3-dioxane, 1,3-dioxolane, and 1,3-dioxepan, and also linear oligo- or polyformals, such as polydioxolane or polydioxepan as comonomers. The preferred polyoxymethylene resins used herein have a number average molecular weight of at least 10,000 and I.V. of least 1.0 (at 25° C. in a 0.2 wt. % solution in hexafluoroisopropanol). The preferred polyoxymethylene copolymers have melting points of at least 150° C. and wt. avg. molecular weight in the range from 5000 to 200,000, and preferably wt. avg. molecular weight of from 7000 to 150,000. Particular preference is given to end-group-stabilized polyoxymethylene polymers which have carbon-carbon bonds at the ends of the chains. Useful polyoxymethylene resins are crystalline, and have a melt index from 3 to 55 g/10 min. @190° C., 2.16 kg. load, with preferable grades including CELCON® with melt indices of 6-23 g/10 min. @190° C., 2.16 kg. load, in accordance with ASTM D1238-82. A more preferred polyoxymethylene is available from Ticona LLC having a melt index of 14 g/10 min at 190° C. under 2.16 kg load.

Included in the polyoxymethylene compound is a polyalkylene glycol represented by

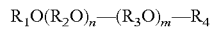

$R_1O(R_2O)_n$—$(R_3O)_m$—$R_4$ wherein $R_1$ and $R_4$ represent hydrogen, alkyl groups having 1 to 30 carbon atoms, acyl groups having 1 to 30 carbon atoms and alkylphenyl groups having 1 to 30 carbon atoms; $R_2$ and $R_3$ represent the same or different alkylene groups having 2 to 6 carbon atoms; and n and m represent integers satisfying the condition of being 1 or more and n+m<1000. Suitable polyalkylene glycol used herein has a mean number average molecular weight of from 10,000 to 45,000, in particular from 20,000 to 40,000. Polyalkylene glycols are obtained in the conventional manner by polycondensation of alkylene glycol as a monomer, e.g., polyethylene glycol, polypropylene glycol or a polyethylene-glycol-polypropylene-glycol block polymer. The polymerization mole number is preferably in the range of 5 to 1,000, more preferably in the range of 10 to 500. Examples of the polyalkylene glycol include polyethylene glycol oleyl ether (ethylene oxide polymerization mole number of 5 to 50), polyethylene glycol cetyl ether (ethylene oxide polymerization mole number of 5 to 20), polyethylene glycol stearyl ether (ethylene oxide polymerization mole number of 5 to 30), polyethylene glycol lauryl ether (ethylene oxide polymerization mole number of 5 to 30), polyethylene glycol tridecylether (ethylene oxide polymerization mole number of 5 to 30), polyethylene glycol nonylphenyl ether (ethylene oxide polymerization mole number of 2 to 100) and polyethylene glycol octylphenyl ether (ethylene oxide polymerization mole number of 4 to 50). Other polyalkylene glycols suitable herein include polyethylene glycol monolaurate (ethylene oxide polymerization mole number of 2 to 30), polyethylene glycol monostearate (ethylene oxide polymerization mole number of 2 to 50) and polyethylene glycol monooleate (ethylene oxide polymerization mole number of 2 to 10). The polyalkylene glycols may be used individually or in combination. The amount of polyalkylene glycol in the compound is preferably from 0.5 to 5% by weight, particularly preferably from 1 to 3% by weight. Preferred polyalkylene glycols are polyethylene glycol and polypropylene glycol, particularly preferably polyethylene glycol.

The proportion of metal oxide in the compound ranges from 0.1% to 10%, preferably from 0.5 to 5% by weight, particularly preferably from 0.5 to 3% by weight of zinc oxide as the metal oxide. The metal oxides include oxides of zinc, magnesium, calcium, manganese oxide and the like.

Also included in the polyoxymethylene compound herein is a comb polymer comprising two discrete types of moieties one of which has higher polarity relative to the other moiety. Polarity of a polymer moiety is proportional to the fraction of polar components, e.g., O, N, S, P atoms and/or ionizable groups to total molecular weight including hydrocarbon components. Some examples include aminonalkyl, phosphino, phosphono-, sulfono-, oxo-, acyl, oxyalkyl- and the like. The moieties are covalently bonded together in multiple steps. The separate discrete moieties of varying polarity mean that one moiety has a higher proportion of hydrocarbon to the polar portion than the other moiety which has a relatively higher proportion of polar components to the total. In the preferred embodiment comb polymer, the polymer backbone is the relatively less polar moiety, and the relatively more polar moiety is made up of several side chains. Coupling of side chains to reactive backbone sites is a well-developed art for making comb polymers. Comb polymers include single and double comb polymer depending upon the number of functional groups arising in the repeat units of the backbone.

Methods of synthesis of comb polymers are known. See, *Applications of Anionic Polymerization Research*, R. P. Quirk Ed, ACS Symp. Ser. 696, 208(1998); and *Practical Applications of Macromonomer Techniques for the Synthesis of Comb-Shaped Copolymers*, Authors S. Roos, A. H. E. Muller, M. Kaufmann, W. Siol, C. Auschra.

Thermoplastic comb polymers containing discrete polar and nonpolar moieties have been disclosed by Milkovich, et. al. See, U.S. Pat. No. 4,085,168 and patents citing upon U.S. Pat. No. 4,085,168. In one approach, a copolymer is formed by copolymerizing relatively more polar, ethylenically unsaturated monomer, further copolymerized with a relatively less polar macromonomer having copolymerizable ethylenic unsaturated chain end groups. Terminal ethylenic unsaturation may conveniently be provided by substituting a terminal halogen of a vinyl monomer, or hydroxyl group reaction with poly (N═C═O) compounds subsequently reacted with ethylenic unsaturated compounds co-reactive with isocyanate groups, as these method are known. The less polar macromonomer in this embodiment is characterized as having polydispersity (Mw/Mn) equal or below about 2, measured by gel permeation chromatography (GPC), preferably less than 1.8, more preferably not more than 1.6, still more preferably not more than 1.5, in particular not more than 1.4 and most preferably not more than 1.3. GPC is carried out using a polystyrene column, among others, using chloroform or tetrahydrofiran, among others, as the mobile phase, and the molecular weight values are determined in terms of polystyrene equivalents.

In one embodiment comb polymer the macromonomer polymer chain contain polymerized ethylenically unsaturated monomers. For example a backbone of the macromonomer can be a polymerized segment selected from polyolefin, poly (meth)acrylate, or styrene type polymers. An exemplary comb polymer may be prepared by reacting a methyl methacrylate-methacrylic acid-methoxy polyethylene oxide methacrylate macromonomer by radical polymerization and resulting in a polymerizable double bond-containing group at one molecular terminus thereof per molecule. A subsequent reaction of the double bonds of the macromonomer can result in an addition polymer, or a grafted polymer. The macromonomer can have a degree of polymerization preferably from 10 to 1,000, more preferably from 20 to 1,000, and most preferably from 20 to about 200. The method to form a macromonomer is not particularly restricted and may be produced by free radical, living radical polymerization, by atom transfer radical polymerization.

Well-defined comb polymers have been devised by the use of atom transfer radical polymerizations, employing a transition metal complex whose central metal is an element of the group 7, 8, 9, 10 or 11 of the periodic table and include copper, nickel, ruthenium and iron complexes, in particular a copper complex. See, U.S. Pat. No. 6,979,716, incorporated herein by reference.

In another embodiment comb polymer comprising a relatively nonpolar hydrophobic hydrocarbon backbone, with relatively more polar side chains and comprises a macromonomer containing poly α olefin and minor amount (e.g., 0.1-5 wt. percent) on total monomer weight of an acid containing monomer. The terms "acid containing-" and "acid-functional-" are used interchangeably and means any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. The acid-containing end groups are subsequently partly or completely esterified using alcohols containing 10-30 carbon atoms, and preferably $C_{18}$-$C_{24}$ alcohols.

The macromonomer may in the alternative be prepared from polymerized mercapto-olefins. Mercapto-olefin compounds are those such as disclosed in U.S. Pat. No. 5,247,000 to Amick. U.S. Pat. No. 5,247,000 provides another method to prepare comb polymers.

Other methods for forming comb polymers are known, e.g., living radical polymerization, and atom transfer radical polymerization which uses an organic halide or halogenated sulfonyl compound or the like as the initiator and a transition metal complex as the catalyst for polymerizing vinyl monomers, has, in addition to the above-mentioned advantageous features of "living radical polymerization", the advantages in that it gives a polymer having a halogen or the like, which is relatively advantageous to functional group conversion, at main chain termini and that the degree of freedom is great in initiator and catalyst designing and, therefore, it is more preferred as the method of producing vinyl polymers having a specific functional group. Atom transfer radical polymerization is described, for example, by Matyjaszewski et al. in the J. Am. Chem. Soc., 1995, vol. 117, pages 5614 ff.; Macromolecules, 1995, vol. 28, pages 7901 ff.; Science, 1996, vol. 272, pages 866 ff.; WO 96/30421, WO 97/18247, WO 98/01480 and WO 98/40415 and by Sawamoto et al. in Macromolecules, 1995, vol. 28, pages 1721 ff; Japanese Kokai Publication Hei-09-208616 and Japanese Kokai Publication Hei-08-41117, among others.

The most preferred comb polymer used herein is prepared by forming a macromonomer from $C_{20}$-$C_{24}$ alpha olefin and maleic anhydride, followed by esterification of pendant carboxylic groups with N, S, or O-containing moieties. The acid-containing end groups are preferably esterified using long chain alcohols. By long chain is meant alcohols containing 10-30 carbon atoms, and preferably are the $C_{18}$-$C_{24}$ alcohols. The most preferred comb polymer is prepared by forming a macromonomer from $C_{20}$-$C_{24}$ alpha olefin and maleic anhydride as the comonomer, followed by esterification of pendant carboxylic groups using $C_{16}$-$C_{18}$ alcohol.

The polyoxymethylene compound can optionally further contain other additives, e.g. other fillers, reinforcing materials selected from the group consisting of, lubricants, plasticizers, pigments, dyes, optical brighteners, processing auxiliaries, processing aids, formaldehyde scavengers, acid scavengers, antioxidants, UV stabilizers, coupling agents, nucleating agents, and mold-release agents, the proportion of any of which can generally range, as a suggested amount of from 0.005 to 5 parts by weight per 100 parts by weight of polyoxymethylene. Optional reinforcing fibers include glass, carbon fibers, and aramid fibers. Fillers include chalk, wollastonite. Slip enhancing additives include polytetrafluoroethylene (PTFE), and ultrahigh-molecular-weight polyethylene (UHMWPE).

Compounding of the ingredients making up the polyoxymethylene compound entails melt kneading at temperatures higher than the melting point of the polyoxymethylene resin and lower than the temperature where decomposition occurs. The mixtures according to the invention are prepared, for example, by intensively mixing the constituents at elevated temperature above the meting point of component A, i.e. at from about 160 to 250° C., preferably at from 180 to 220° C., in equipment with a good mixing action, for example in compounders or extruders, advantageously in kneaders, for example BUSS® or Pomini® type or twin screw extruders. The pulverulent components are usually first mixed mechanically at room temperature and subsequently melted for complete homogenization. If the temperature of mixing is lower than about 160° C., the structure of the electrically conductive carbon black is developed with difficulty and sufficient electrical conductivity cannot be obtained. If the temperature is higher than 240° C., the polyoxymethylene resin rate of decomposition is higher, resulting in reduction of mechanical strength. The temperature is more preferably 220-240° C. Incorporation of additives may be made by employing masterbatches or concentrates thereof. Fibrous materials can, for example, also be fed to the mixing equipment, in particular the extruder, as continuous material.

EXAMPLES

|  |  | 1 | 2 | 3 | 4 | 5 |
|---|---|---|---|---|---|---|
| Component A |  | 86.3 | 85.8 | 86.3 | 85.8 | 86.3 |
| Component B |  | 2 | 2 | 2 | 2 | 0 |
| Component C |  | 1 | 1 | 0 | 0 | 0 |
| Component D |  | 6.5 | 7 | 6.5 | 7 | 6.5 |
| Component E |  | 0 | 2.0 | 0.0 | 2 | 2 |
|  | Method | 1 | 2 | 3 | 4 | 5 |
| Melt Flow Rate | g/10 min ISO 1133 | 2.2 | 2.1 | 2.5 | 3.1 | 2.6 |
| Tensile Stress @ Yield | MPa ISO 527 | no yield | 49.8 | no yield | 53.2 | No yield |
| Tensile Elongation at Yield | % ISO 527 | no yield | 4.9 | no yield | 4.7 | No yield |
| Tensile Elongation at Break | % ISO 527 | 2.85 | 20.1 | 4 | 14.8 | 2.6 |
| Tensile Modulus | MPa ISO 527 | 2730 | 2560 | 2620 | 2630 | 2820 |
| Charpy - Notched | kJ/m2 ISO 179 | 4 | 4.7 | 4.1 | 4.6 | 2.8 |
| Volume Resistivity | ohm-cm IEC 60093 | 203 | 465 | 357 | 907 | 1135 |

Except for melt floe rate, testing was done on injection molded tensile bars.

A yield before break under tensile elongation is desirable.

Higher elongation at break is desirable.

The invention as represented by Example 2 shows a surprising balance of comparatively high elongation at break, low volume Resistivity without sacrificing the other physical properties. Experience with multiple lot runs of the invention shows improved consistency of properties.

A) =polyoxymethylene

B) =Polyalkylene glycol;

C) =Zinc oxide;

D) =high structure carbon black with a nominal dibutyl phthalate absorption of 330 ml/100 g;

E) =Comb polymer which comprises MA/$C_{20-24}$ olefin copolymer at least partially esterified with linear aliphatic alcohol. CAS no. 134210-67-6.

What is claimed:

1. A thermoplastic molding composition comprising polyoxymethylene, polyalkylene glycol, metal oxide, high structured particulate carbon black, and a comb polymer containing two discrete types of moieties one of which has higher polarity relative to the other moiety, the comb polymer comprising a poly-alpha-olefin and an acid containing monomer.

2. The composition according to claim 1 wherein on a weight basis, the polyoxymethylene level is 30 to 98.7%, the polyalkylene glycol level is from 0.1 to 10%, the metal oxide level is from 0.1 to 10%, the highly structured particulate carbon black level is from 1 to 15%, and the comb polymer level is from 0.1 to 15%.

3. The composition claimed in 1, wherein the polyalkylene glycol has a mean number average molecular weight of from 10,000 to 45,000.

4. The composition as claimed in 1, wherein the polyalkylene glycol used is selected from polyethylene glycol and polypropylene glycol.

5. The composition claimed in 4, wherein the polyalkylene glycol has a mean number average molecular weight from 20,000 to 40,000 and is present in amount from 0.5 to 5% by weight.

6. The composition as claimed in claim 1, wherein the polyalkylene glycol is present in amount from 1 to 3% and the metal oxide is zinc oxide and is present in the amount from 0.5 to 3% by weight.

7. The composition as claimed in claim 6, further comprising 0.1 to 5% by weight of an additive selected from a formaldehyde scavenger and a stabilizer.

8. The composition as claimed in claim 1, wherein the metal oxide is present in amount from 0.5 to 5% by weight.

9. An injection molded component of a fuel system comprising a molding from the composition of claim 1 wherein the molding exhibits a volume resistivity of from $10^0$ to $10^6$ ohm-cm.

10. The composition according to claim 1, wherein the composition exhibits a volume resistivity of from $10^0$ to $10^3$ ohm-cm.

11. The composition according to claim 1, wherein the polyoxymethylene comprises a polyoxymethylene copolymer.

12. The composition according to claim 11, wherein the polyoxymethylene copolymer comprises from 60% to 99.9% oxymethylene and the remainder oxy(higher alkylene) groups.

13. A thermoplastic molding composition comprising polyoxymethylene, polyalkylene glycol, metal oxide, high structured particulate carbon black, and a comb polymer containing two discrete types of moieties one of which has higher polarity relative to the other moiety, wherein the comb polymer comprises a macromonomer formed from a $C_{20}$ to $C_{24}$ alpha olefin and an acid containing monomer that has been esterified with N, S, or O-containing moieties.

14. The composition according to claim 13, wherein the acid containing monomer comprises maleic anhydride.

15. The composition according to claim 13, wherein the macromonomer is esterified by a $C_{10}$ to $C_{30}$ alcohol.

16. The composition according to claim 14, wherein the macromonomer is esterified by a $C_{10}$ to $C_{30}$ alcohol.

17. The composition according to claim 13, wherein the acid containing monomer is present within the macromonomer in an amount from 0.5% to about 5% by weight based on the total weight of the monomers.

18. The composition according to claim 16, wherein the acid containing monomer is present within the macromonomer in an amount from 0.5% to about 5% by weight based on the total weight of the monomers.

19. The composition claimed in claim 1, wherein the acid containing monomer in the comb polymer is partly or completely esterified.

20. The composition according to claim 19, wherein the acid containing monomer is partly or completely esterified using a $C_{10}$ to $C_{30}$ alcohol.

21. The composition according to claim 1, wherein the comb polymer is contained in the composition in an amount from about 0.1% to about 5% by weight.

22. The composition according to claim 2, wherein the comb polymer comprises a macromonomer formed from a $C_{20}$ to $C_{24}$ alpha olefin and an acid containing monomer that has been esterified with N, S, or O-containing moieties.

* * * * *